(12) United States Patent  
Iwase

(10) Patent No.: US 7,511,906 B2
(45) Date of Patent: Mar. 31, 2009

(54) DISK DEVICE AND METHOD OF CONTROLLING THE DISK DEVICE

(75) Inventor: Takeshi Iwase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 11/442,757

(22) Filed: May 30, 2006

(65) Prior Publication Data

US 2007/0201155 A1 Aug. 30, 2007

(30) Foreign Application Priority Data

Feb. 28, 2006 (JP) .............................. 2006-053644

(51) Int. Cl.
*G11B 5/60* (2006.01)

(52) U.S. Cl. .......................... 360/31; 360/75

(58) Field of Classification Search ....................... None
See application file for complete search history.

(56) References Cited

U.S. PATENT DOCUMENTS

| | | | | |
|---|---|---|---|---|
| 5,594,595 | A * | 1/1997 | Zhu ............................. | 360/31 |
| 5,742,446 | A * | 4/1998 | Tian et al. ..................... | 360/75 |
| 6,008,640 | A * | 12/1999 | Tan et al. ..................... | 324/212 |
| 6,894,854 | B1 * | 5/2005 | Carlson et al. ................ | 360/31 |
| 2003/0184899 | A1 * | 10/2003 | Gay Sam et al. .............. | 360/25 |
| 2003/0218815 | A1 * | 11/2003 | Loh et al. ..................... | 360/31 |
| 2006/0158769 | A1 * | 7/2006 | Ono et al. ..................... | 360/75 |

FOREIGN PATENT DOCUMENTS

JP 9-231502 9/1997
JP 2000-251430 9/2000

* cited by examiner

*Primary Examiner*—Hoa T Nguyen
*Assistant Examiner*—James L Habermehl
(74) *Attorney, Agent, or Firm*—Greer, Burns & Crain, Ltd.

(57) ABSTRACT

A disk device, in which information is written by a magnetic head at an arbitrary position on a magnetic recording surface of a disk and the information written at the arbitrary position is read out, includes a control unit for controlling an operation of writing information at the arbitrary position on the magnetic recording surface of the disk and for controlling an operation of reading out the information written at the arbitrary position. The disk device also includes a modulation detecting unit for detecting that a modulation has been generated, by contact between the magnetic head and the disk, on the basis of a regenerative signal of a single frequency data region which is reproduced by a reproducing head element when the magnetic head is moved to a predetermined position in each track, wherein the single frequency data region is previously formed at the predetermined position in each track. On the other hand, a method of controlling the disk device, in which the above disk device is used, is disclosed.

2 Claims, 11 Drawing Sheets

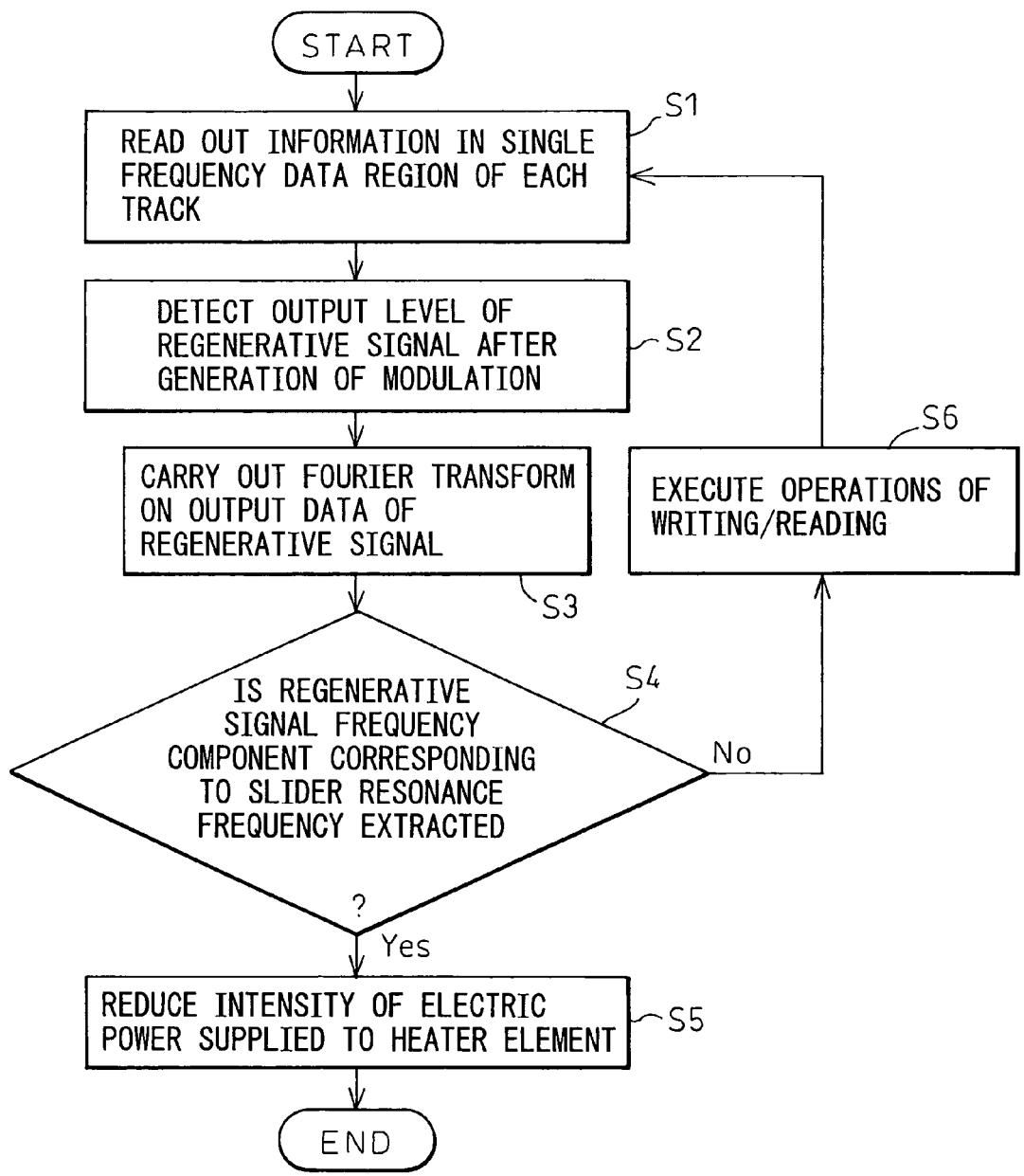

DISK DEVICE AND METHOD OF CONTROLLING THE DISK DEVICE

BACKGROUND OF THE INVENTION

1. Field of the Invention

The present invention relates to a disk device, such as a magnetic disk device or an optical magnetic disk device, for writing information (data) at an arbitrary position on a magnetic recording surface of a medium, represented by a disk such as a magnetic disk, with a magnetic head including a recording head element and a reproducing head element. More particularly, the present invention relates to a disk device having a function of controlling a magnetic space formed between a magnetic head and a medium on the disk when an amount of protrusion of a recording element or a reproducing element onto a magnetic recording surface of the medium is changed by heating the recording element or the reproducing element with a heater arranged close to the recording element or the reproducing element, according to an environment of the use of the disk device.

On the other hand, the present invention relates to a method of controlling the disk device for controlling the magnetic space formed between the magnetic head and the medium of the disk, by changing the amount of protrusion of the recording head element or the reproducing head element when the recording head element or the reproducing head element is heated by the heater element arranged close to the recording head element or the reproducing head element.

2. Description of the Related Art

In a disk device such as a magnetic disk device, data is written when information is recorded at arbitrary positions in a plurality of tracks concentrically formed on the disk in a region ranging from an outer circumferential portion of the disk to an inner circumferential portion of the disk with a recording head element of a magnetic head represented by a thin film magnetic head. Further, data is read out when information recorded at arbitrary positions in the plurality of tracks is reproduced with the reproducing head element of the magnetic head.

Concerning the magnetic recording system used at the time of recording data in the medium on the disk, the following two recording systems are provided. One is a longitudinal magnetic recording system, which has already been put into practical use, in which a direction of the magnetization signal agrees with an in-plane direction of the magnetic recording surface of the medium. The other is a perpendicular magnetic recording system in which a direction of the magnetization signal is vertical to the magnetic recording surface of the medium.

In a disk device in which either the longitudinal magnetic recording system or the perpendicular magnetic recording system is used, in general, in order to stably carry out the data writing operation and the data reading operation at an arbitrary position on the magnetic recording surface of the medium while the magnetic head is being moved under the condition that the magnetic head is floating above the magnetic recording surface of the medium, a predetermined magnetic space is provided between a head floating surface of the magnetic head and a magnetic recording surface of the medium. In this case, the terminology of "the head floating surface" denotes a surface of the magnetic head, which is held by a slider under the condition that the magnetic head is floating from the magnetic recording surface of the medium of the disk, opposed to the magnetic recording surface of the medium. Here, the head floating surface is referred to as an ABS (air bearing surface). Alternatively, the head floating surface is referred to as a surface facing to a medium.

Recently, there is a tendency that a storage capacity of a disk device such as a magnetic disk device has been remarkably increased. The increase in the storage capacity described above is mainly accomplished by an increase in the recording density on a magnetic recording surface of a medium. In order to increase the recording density as described above, two methods are provided. One is a method in which a core width of the magnetic head is reduced so as to increase the track density in the radial direction of the medium. The other is a method in which information is recorded relatively densely in the circumferential direction of the medium so as to increase the recording density in the bit direction.

Further, according to the environment of the use of the disk device, in order to further increase the storage capacity, it is necessary that S/N ratio (a ratio of signal to noise) in a regenerative signal reproduced by the reproducing head element is increased to as high as possible by decreasing an amount of floating of the magnetic head.

Therefore, it is conventional to use a disk device on which a magnetic head is mounted, which has a heater heating function including a heater element arranged close to a reproducing head element (or a recording head element). In the disk device having the above-mentioned configuration, the control of the magnetic head can be carried out as follows. In order to increase the S/N ratio of a regenerative signal of a reproducing head element according to the environment of the use of the disk device, a portion close to the reproducing head element is heated by the heater element so that an amount of protrusion of the reproducing element onto the magnetic recording surface can be intentionally increased and a magnetic space between the reproducing head element and the medium can be relatively decreased.

In general, in a disk device such as a magnetic disk device, in order to maintain a state in which a magnetic head is floating above a medium surface (a magnetic recording surface) of a medium, the magnetic head is mounted on a slider arranged at a forward end portion of a head supporting portion.

In a conventional magnetic disk device, when a heater element is arranged close to a reproducing head element in a magnetic head, the magnetic head having a heater heating function is formed. Usually, in order to protect the recording head element, the reproducing element and the heater element, the entire magnetic head is usually covered with a non-magnetic insulating layer made of alumina. In this case, when a portion close to the reproducing head element is heated by the heater element, alumina is expanded and a head floating surface (ABS) of the slider of the magnetic head is protruded out toward a medium surface. Therefore, an amount of protrusion of the reproducing head element in the magnetic head onto the medium surface is increased. Therefore, the amount of protrusion of the reproducing head element is controlled so that a magnetic space between the magnetic head and the medium can be relatively reduced. As a result, it becomes possible to increase the S/N ratio of the regenerative signal of the reproducing head element.

However, in the conventional disk device, when the reproducing head element is intentionally protruded, a magnetic space related to a head disk interface (HDI) between the magnetic head and the medium is decreased. Therefore, the magnetic head and the medium surface of the medium are likely to be contacted with each other by HDI. Owing to the contact of the magnetic head with the medium surface of the medium, a modulation is generated in the regenerative signal of the reproducing head element, and an output waveform of the regenerative signal fluctuates. Consequently, a problem may occur in that data can not be normally read out. Further, another problem may occur in that the reproducing head is physically damaged and the magnetic characteristic is deteriorated.

In this connection, Patent Document #1 (Japanese Unexamined Patent Publication (Kokai) No. 2000-251430) and Patent Document #2 (Japanese Unexamined Patent Publication (Kokai) No. 9-231502) are presented as technical documents of the prior art related to the conventional disk device described above. Patent Document #1 (JPP'430) discloses a magnetic disk device in which a collision of the magnetic head with the disk can be detected under a practically used environmental condition so that a fluctuation of the flying height (the flying amount) of the magnetic head can be estimated and so that a degree of danger of the head crash can be also estimated. The head collision detecting method in the magnetic disk device of Patent Document #1 is a method in which a gap (a magnetic space) related to HDI between the magnetic head and the disk is observed by a change in the output of a servo signal. In other words, this method is not a method in which a fluctuation caused by the modulation of the output waveform generated by the contact of the magnetic head with the disk is directly detected. The head collision detecting method disclosed in Patent Document #1 described above is disadvantageous in the following point. Even in the case in which an output of the regenerative signal of the magnetic head fluctuates, which is not based on a change in the floating amount of the magnetic head, it may be recognized that this output fluctuation is generated by a change in the floating amount of the magnetic head.

Patent Document #2 (JPP'502) discloses a method of inspecting a magnetic disk medium, in which a peak value of the spike-shaped waveform outputted from the detection means can be accurately detected; and a position of contact between the reproducing head element in the magnetic head and the magnetic disk medium can be accurately specified not only in the track direction but also in the circumferential direction so as to grasp a result of detection of the contact two-dimensionally. The above-mentioned method is a method in which a contact between the reproducing head and the magnetic disk medium is detected by utilizing thermal asperity (TA) of the reproducing head element. In this case, thermal asperity (TA) is a spike-shaped noise of the regenerative signal generated when the reproducing head element is instantaneously heated. In other words, the above-mentioned method is not a method in which a change in the output waveform caused by the modulation, which is generated by the contact between the magnetic head and the disk, is directly detected. Thermal asperity is a phenomenon in which, when the reproducing head such as a magneto-resistance effect element comes into contact with the medium, the temperature is raised and a change in the resistance of the reproducing head caused at this time affects the regenerative signal. Accordingly, the phenomenon of thermal asperity is not generated unless the reproducing head element itself directly collides with the medium. In other words, the above-mentioned method disclosed in Patent Document #2 is disadvantageous in the following point. In the case in which any portion other than the slider and the reproducing head element of the magnetic head comes into contact with the medium, it is impossible to accurately detect a contact between the magnetic head and the medium.

Therefore, both Patent Documents #1 and #2 have the following disadvantages. In the case in which the magnetic head and the medium are contacted with each other by HDI, the same problems as those of the disk device on which the conventional magnetic head having a heater heating function is mounted, may be caused.

SUMMARY OF THE INVENTION

The present invention has been accomplished to solve the above problems of the prior art. It is an object of the present invention to provide a disk device and a method of controlling the disk device, in which contact between the magnetic head and the medium of the disk can be accurately detected at the time of using the disk device and, by evading the occurrence of this contact, a change in the regenerative signal output waveform, which is generated by this contact, can be prevented and further a deterioration of the magnetic characteristic of the reproducing head element in the magnetic head can be prevented.

In order to accomplish the above object, the first aspect of the present invention provides a disk device comprising a disk drive unit for pivotally driving a disk; a magnetic head including a recording head element for recording information at arbitrary positions in a plurality of tracks formed in a region ranging from an inner circumferential portion to an outer circumferential portion of the disk and also including a reproducing head element for reproducing the information recorded at the arbitrary positions in the plurality of tracks; a head drive unit for driving the magnetic head so that the magnetic head can be moved between the plurality of tracks of the disk; and a control unit for controlling various operations including an operation of writing information at arbitrary positions of the disk with the magnetic head and also including an operation of reading out the information written at the arbitrary positions, wherein a single frequency data region is previously formed at a predetermined position in each track of the disk, the disk device further comprising a modulation detecting means for detecting the generation of modulation, which is caused by contact between the magnetic head and the disk, on the basis of a regenerative signal of the single frequency data region reproduced by the reproducing head element when the magnetic head is moved to a predetermined position of each track.

Further, the second aspect of the present invention provides a disk device comprising a disk drive unit for pivotally driving a disk; a magnetic head including a recording head element for recording information at arbitrary positions in a plurality of tracks formed in a region ranging from an inner circumferential portion to an outer circumferential portion of the disk and also including a reproducing head element for reproducing the information recorded at the arbitrary positions in the plurality of tracks and also including a heater element arranged close to the recording head element or the reproducing head element so as to heat the recording head element or the reproducing head element; a head drive unit for driving the magnetic head so that the magnetic head can be moved between the plurality of tracks of the disk; and a control unit for controlling various operations including an operation of writing information at arbitrary positions of the disk with the magnetic head and also including an operation of reading out the information written at the arbitrary positions, wherein a single frequency data region is previously formed at a predetermined position in each track of the disk, the disk device further comprising a modulation detecting means for detecting the generation of modulation, which is caused by contact between the magnetic head and the disk, on the basis of a regenerative signal of the single frequency data region reproduced by the reproducing head element when the magnetic head is moved to a predetermined position of each track, wherein when the generation of the modulation is detected, the control unit reduces an amount of protrusion of the recording head element or the reproducing head element by decreasing an intensity of electric power supplied to the heater element.

Further, the third aspect of the present invention provides a method of controlling a disk device, the disk device comprising a disk drive unit for pivotally driving a disk; a magnetic head including a recording head element for recording information at arbitrary positions in a plurality of tracks formed in a region ranging from an inner circumferential portion to an outer circumferential portion of the disk and also including a reproducing head element for reproducing the information recorded at the arbitrary positions in the plurality of tracks; a head drive unit for driving the magnetic head so that the magnetic head can be moved between the plurality of tracks of the disk; and a control unit for controlling various operations including an operation of writing information at arbitrary positions of the disk with the magnetic head and also including an operation of reading out the information written at the arbitrary positions, the method of controlling the disk device including a step of previously forming a single frequency data region at a predetermined position in each track of the disk; a step of reading out a regenerative signal of the single frequency data region by the reproducing head element when the magnetic head is moved to a predetermined position of each track; and a step of detecting the generation of modulation, which is caused by contact between the magnetic head and the disk, on the basis a regenerative signal of the single frequency data region.

Further, the fourth aspect of the present invention provides a method of controlling a disk device, the disk unit comprising a disk drive unit for pivotally driving a disk; a magnetic head including a recording head element for recording information at arbitrary positions in a plurality of tracks formed in a region ranging from an inner circumferential portion to an outer circumferential portion and also including a reproducing head element for reproducing the information recorded at the arbitrary positions in the plurality of tracks and also including a heater element arranged close to the recording head element or the reproducing head element so as to heat the recording head element or the reproducing head element; a head drive unit for driving the magnetic head so that the magnetic head can be moved between the plurality of tracks of the disk; and a control unit for controlling various operations including an operation of writing information at arbitrary positions of the disk with the magnetic head and also including an operation of reading out the information written at the arbitrary positions, the method of controlling the disk device including a step of previously forming a single frequency data region at a predetermined position in each track of the disk; a step of reading out a regenerative signal of the single frequency data region by the reproducing head element when the magnetic head is moved to a predetermined position of each track; a step of detecting the generation of modulation, which is caused by contact between the magnetic head and the disk, on the basis of a regenerative signal of the single frequency data region; and a step of reducing an amount of protrusion of the recording head element or the reproducing head element by decreasing an intensity of electric power supplied to the heater element when the generation of the modulation is detected.

The present invention can be summarized as follows. First, according to the present invention, the single frequency data region is previously formed at a predetermined position in each track, and when the magnetic head is moved to the predetermined position in each track, a regenerative signal of the single frequency data region is read out by the reproducing head element. Usually, in the case in which the magnetic head comes into contact with the medium of the disk, by the natural oscillation of the slider that holds the magnetic head, a modulation of several hundred kHz corresponding to the resonance frequency of the natural oscillation appears in the regenerative signal of the reproducing head element. A Fourier transform is carried out on the signal data of the regenerative signal in which the modulation has appeared, and a regenerative signal frequency component corresponding to the frequency of the modulation is extracted. Due to the foregoing, it is possible to accurately detect that the modulation has been generated by a contact between the magnetic head and the medium of the disk.

Second, according to the present invention, in the case in which it is detected that the modulation has been generated by the contact between the magnetic head and the medium of the disk, electric power supplied to the heater element, which is arranged close to the reproducing head, is reduced so that an amount of protrusion of the reproducing head element (or the recording head element) onto the medium surface can be decreased. Due to the foregoing, the contact of the magnetic head with the medium of the disk can be evaded. Due to the foregoing, it is possible to prevent the generation of the modulation which appears in the regenerative signal when the magnetic head is contacted with the medium of the disk. Further, it is possible to prevent the magnetic characteristic of the reproducing head element from deteriorating.

In this connection, as described before, according to the technique disclosed in Patent Document #2, unless the reproducing head element itself directly collides with the medium, it is impossible to detect a spike-shaped noise of the regenerative signal caused by thermal asperity. However, according to the present invention, as long as any portion of the slider comes into contact with the medium, a modulation caused by the natural oscillation of the slider appears in the regenerative signal. Therefore, the present invention is advantageous in that the contact between the magnetic head and the medium can be more assuredly detected.

BRIEF DESCRIPTION OF THE DRAWINGS

The above object and features of the present invention will be more apparent from the following description of some preferred embodiments with reference to the accompanying drawings, wherein:

FIG. 11 is a flow chart for explaining a control flow of a disk device of an embodiment of the present invention.

DESCRIPTION OF THE PREFERRED EMBODIMENTS

Before the preferred embodiments of the present invention are explained, by referring to FIGS. 1 and 2, a structure and operation of a conventional disk device will be more specifically explained below.

Figure 1:
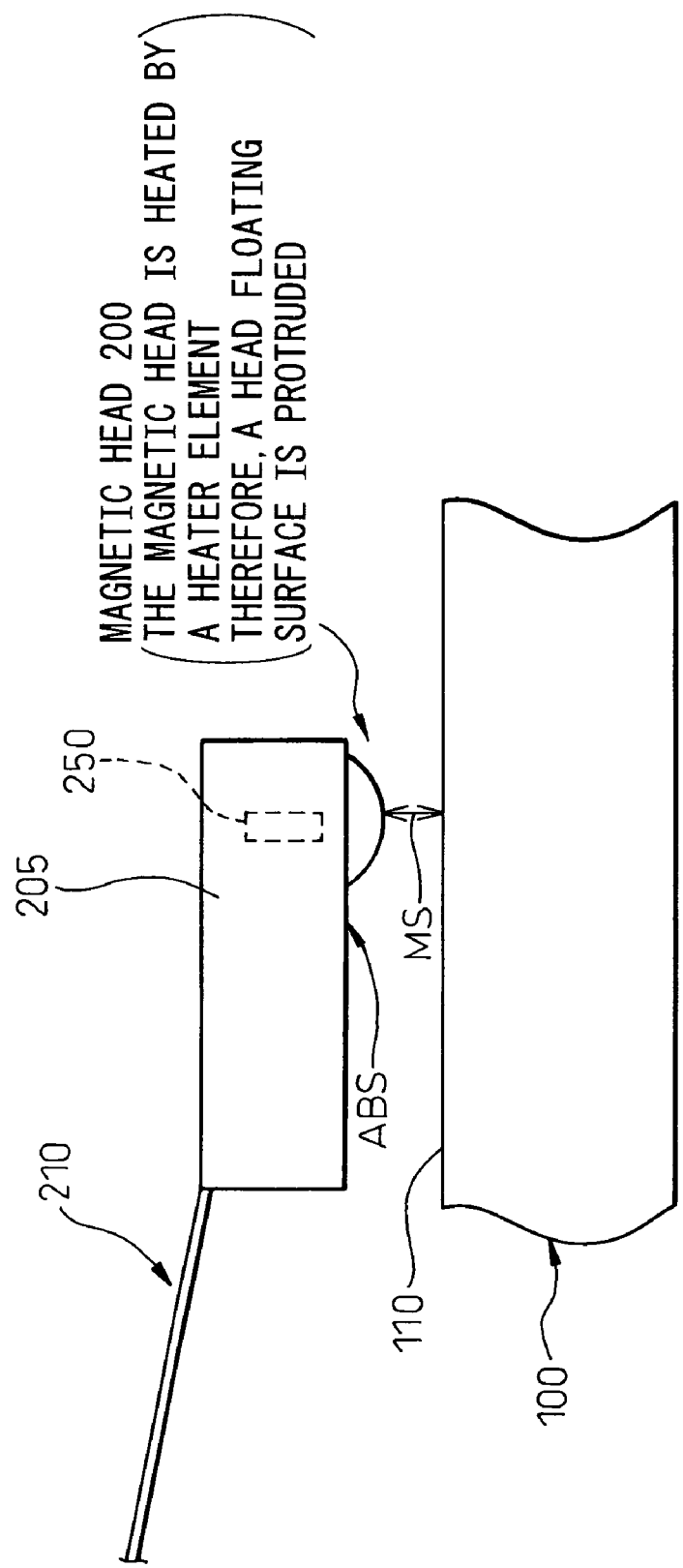
FIG. 1 is a schematic drawing showing a magnetic space formed between a conventional magnetic head, into which a heater heating function is incorporated, and a medium.
Figure 2:
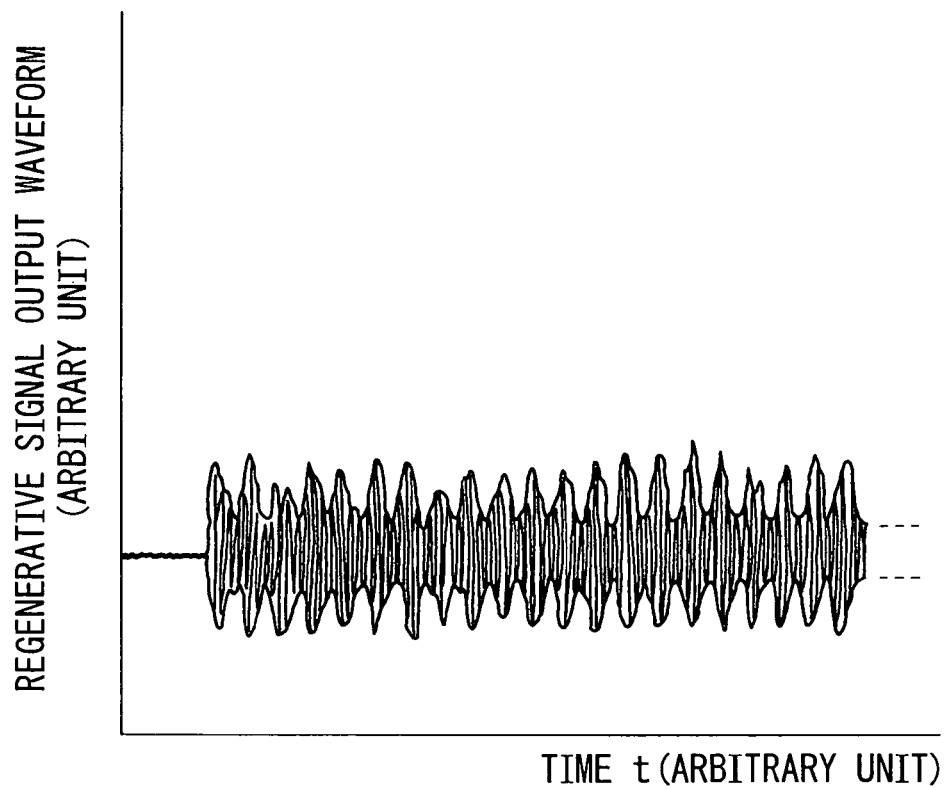
FIG. 2 is a signal waveform diagram showing circumstances in which an output waveform of a regenerative signal fluctuates due to contact between a magnetic head and a medium.

FIG. 1 is a schematic drawing showing a magnetic space formed between a magnetic head, into which a heater heating function is incorporated, and a medium in a conventional disk device. FIG. 2 is a signal waveform diagram showing circumstances in which a regenerative signal output waveform fluctuates due to the contact between the magnetic head and the medium. FIG. 1 shows a magnetic head 200, a slider 205 and a head supporting portion 210 of the disk device. FIG. 1 also shows a portion, which is shown enlarged, of a medium 100 represented by a disk. On the other hand, FIG. 2 briefly shows the circumstances in which a regenerative signal output waveform (arbitrary unit) fluctuates with respect to the time t (arbitrary unit).

In general, in a disk device such as a magnetic disk device, as shown in FIG. 1, in order to maintain the magnetic head 200 to be floating above the medium surface (the magnetic recording face) 110 of the medium 100, the magnetic head 200 is mounted on the slider 205 arranged at a forward end portion of the head supporting portion 210. More specifically, a magnetic space MS, which is previously prescribed, is provided between the head floating surface (ABS) of the magnetic head 200 and the medium surface 110 of the medium 100.

Further, in the conventional magnetic disk device shown in FIG. 1, when a heater element 250 is arranged close to a reproducing head element (not shown) in the magnetic head 200, the magnetic head having a heater heating function is composed. Usually, in order to protect the recording head element, the reproducing head element and the heater element, the entire magnetic head 200 is usually covered with a non-magnetic insulating layer (not shown) made of alumina. Here, in the case in which a portion close to the reproducing head element is heated by the heater element 250, alumina is expanded, and the slider 205 or the head floating surface (ABS) of the magnetic head 200 protrudes toward the medium surface 110. Therefore, an amount of protrusion of the reproducing head element arranged in the magnetic head 200 onto the medium surface 110 is increased. Accordingly, the amount of protrusion of the reproducing head element is controlled so that the magnetic space MS between the magnetic head 200 (In this case, the reproducing head element) and the medium 100 can be relatively reduced. As a result, it becomes possible to increase the S/N ratio of the regenerative signal of the reproducing head element.

However, in the conventional disk device shown in FIG. 1, when the reproducing head element is intentionally protruded, the magnetic space MS related to a head disk interface (HDI), which is provided between the magnetic head 200 and the medium 100, is reduced. Accordingly, a contact between the magnetic head 200 and the medium 100 caused by HDI tends to be caused. Due to the contact caused by HDI, as shown in FIG. 2, a modulation (shown in FIG. 10 described later) is generated in the regenerative signal of the reproducing head element. Accordingly, a regenerative signal output waveform fluctuates, and it becomes impossible to normally read out data. Further, such a disadvantage is caused that the reproducing head element is physically damaged and the magnetic characteristic is deteriorated.

Referring to the accompanying drawings (FIGS. 3 to 11), explanations will be made into a configuration and operation of the preferred embodiments of the present invention which has been devised in order to overcome the above disadvantage.

Figure 3:
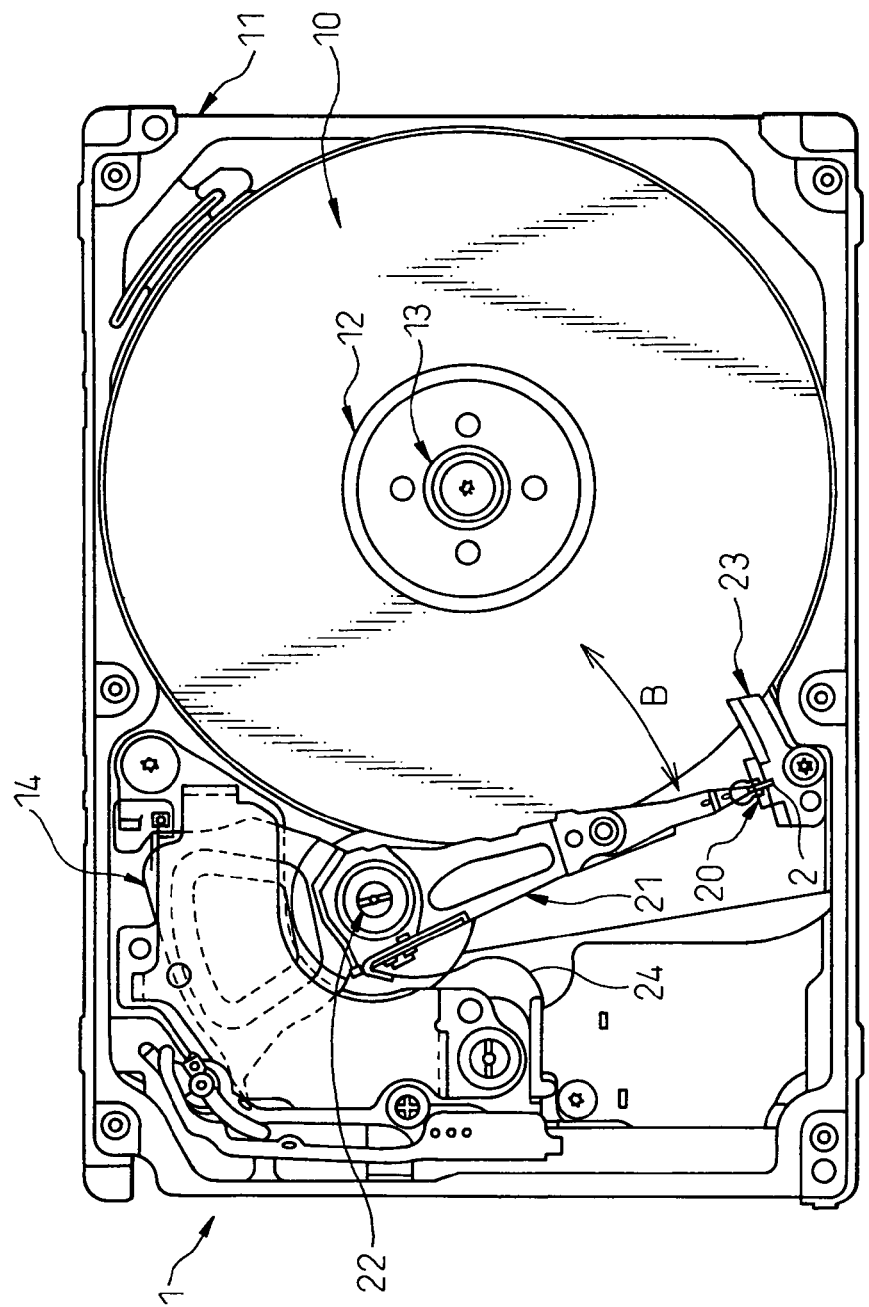
FIG. 3 is a plan view showing an outline of a structure of a mechanism unit of a disk device of an embodiment of the present invention.
Figure 4:
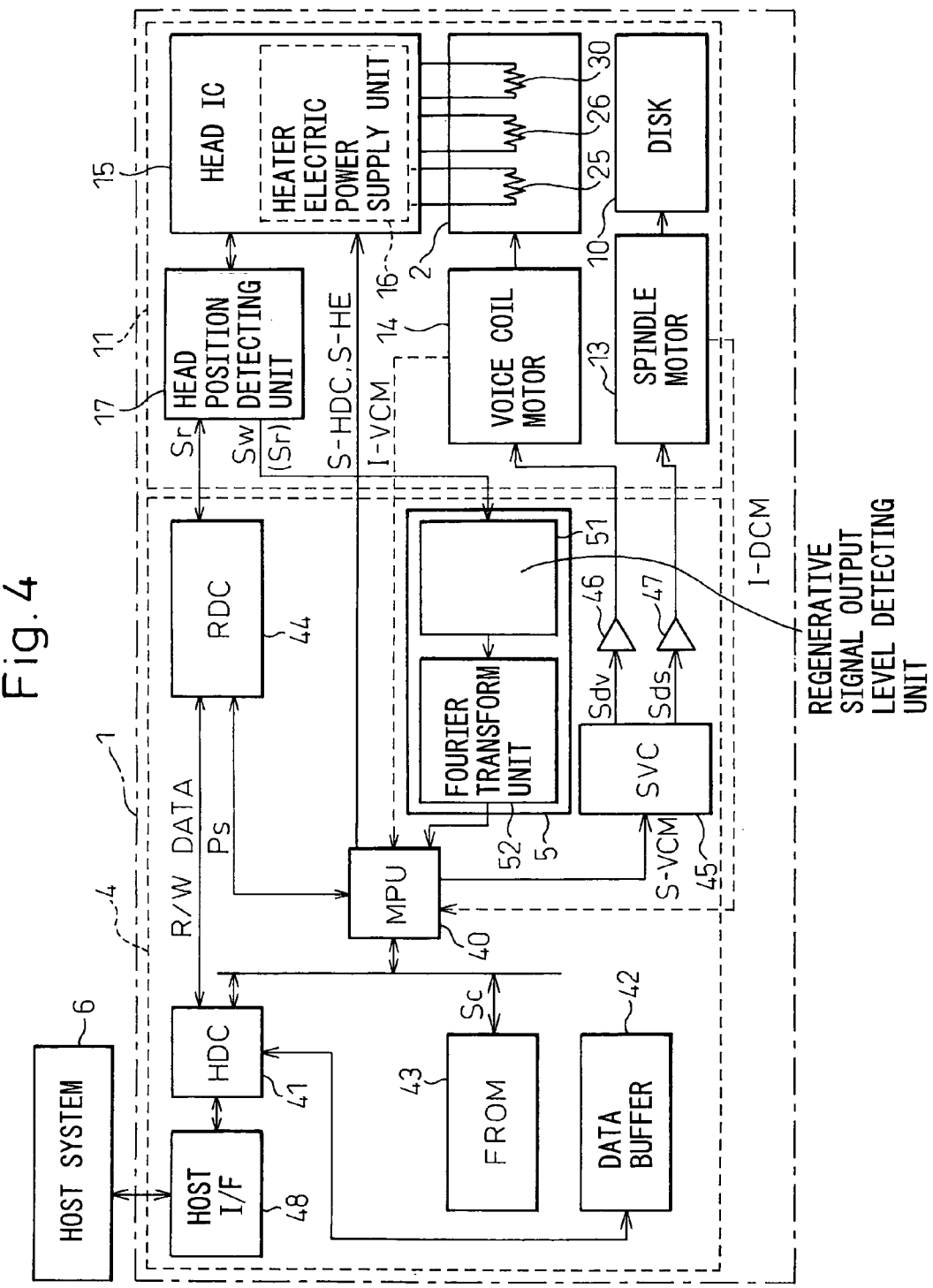
FIG. 4 is a block diagram showing a structure of a control unit of a disk device of an embodiment of the present invention.

FIG. 3 is a plan view showing an outline of a structure of a mechanism unit of a disk device of an embodiment of the present invention, and FIG. 4 is a block diagram showing a structure of a control unit of the disk device of the embodiment of the present invention.

In this case, as a disk device related to the embodiment of the present invention, the disk device 1 such as a magnetic disk device is exemplarily shown which includes a magnetic head for writing and reading information (data) with respect to a rotary disk 10 such as a hard disk. In this case, as the magnetic head described above, a magnetic head 2 having a heater heating function is provided. The magnetic head 2 includes a recording head element 26 such as a thin film inductive type head element used for writing; a reproducing head element 30 such as a magnetic resistance effect element used for reading; and a heater element 25 arranged close to the recording head element 26 or the reproducing head element 30.

Usually, in order to protect the recording head element 26, the reproducing head element 30 and the heater element 25, the magnetic head 2 is entirely covered with a non-magnetic insulating layer (shown in FIGS. 5 and 6 described later) made of alumina. In this case, when a portion close to the reproducing head element 30 is heated by supplying electric power from the heater electric power supply unit 16 to the heater element 25, the alumina is expanded. Therefore, the slider 20 or a head floating surface (ABS) of the magnetic head 2 protrudes toward a medium surface of the disk 10. In other words, the reproducing head element 30 protrudes toward the medium surface of the disk 10 so that an amount of protrusion of the reproducing head element 30 can be controlled in such a manner that a magnetic space formed between the magnetic head 2 and the disk 10 is relatively reduced. Due to the foregoing, the S/N ratio of the regenerative signal of the reproducing head is increased. It is preferable that the heater electric power supply unit 16 is integrated into a head IC in a disk enclosure.

Briefly speaking, the disk device 1 shown in FIGS. 3 and 4 includes a mechanism unit 11 such as a magnetic head 2, a spindle motor 13 and a voice coil motor 14; and a control unit 4 for controlling various operations such as a data writing operation and a data reading operation carried out by the magnetic head 2. In this case, the mechanism unit 11 is accommodated in the disk enclosure, and an electronic circuit system composing the control unit 4 includes an integrated circuit having a plurality of LSI (large scale integrated circuit) mounted on a printed circuit assembly (printed board). The above mechanism unit 11 includes a disk 10 such as a single hard disk or a plurality of hard disks rotated by a spindle motor 13 connected to a spindle 12.

Operation of the spindle motor 13 is controlled by a servo controller 45 (shown in FIG. 4) which will be referred to as SVC by abbreviation. On a magnetic recording surface of the medium surface (or the medium back surface) of the disk 10, a plurality of tracks (or a plurality of cylinders), which are concentrically formed, are provided in a region ranging from the outer circumferential portion (inner side) to the inner circumferential portion (outer side). In a sector at an arbitrary position of the track, a data pattern corresponding to predetermined data is written.

In this case, the terminology of "cylinder" denotes a plurality of tracks, which are located on the disks in the vertical direction, to which a plurality of magnetic heads can simultaneously have access on the disks in the case in which a plurality of disks are arranged being laminated on each other, that is, the terminology of "cylinder" denotes a plurality of tracks formed into a cylindrical shape.

More specifically, in a disk device in which a servo surface servo system is used, a magnetic recording surface of one of the plurality of disks is formed into a servo surface on which a servo signal pattern corresponding to a servo signal used for servo control is formed, and all magnetic recording surfaces of the others of the plurality of disks are formed into data surfaces on which data patterns are formed. On the other hand, in a disk device in which a data surface servo system is used, both the data pattern and the servo signal pattern are formed on the magnetic recording surfaces of the plurality of disks. Recently, a disk device in which the latter data surface servo system is used tends to be commonly used.

In the embodiment of the present invention, in the disk device in which the data surface servo system is used, a single frequency data region including data of a single frequency is previously formed at a predetermined position (for example, a portion of the data pattern region) of the tracks on the disk 10. In this case, in order to stably detect that a modulation of the frequency corresponding to the resonance frequency of the slider 20 has occurred, it is preferable that the single frequency is set at about ½ of the maximum frequency corresponding to the maximum transfer bit speed in each track.

In the disk device 1 shown in FIG. 3, the magnetic head 2 is provided which writes data at an arbitrary position on the magnetic recording surface of the disk 10 and reads the data written at the arbitrary position on the magnetic recording surface. This magnetic head 2 is mounted on the slider 20 arranged at a forward end portion of a head supporting portion (referred to as a suspension) 21. This head supporting portion 21 is driven by a voice coil motor 14 controlled by a servo controller 45 (shown in FIG. 4) so that the head supporting portion 21 can be reciprocated between a plurality of tracks arranged in a region ranging from the inner circumferential portion (inner side) to the outer circumferential portion (outer side) of the disk 10. Due to the foregoing, the magnetic head 2 can have access to the sectors in all data regions on the magnetic recording surface of the disk 10 in which data is written. In this case, in order for the head supporting portion 21 to be smoothly reciprocated, a pivot bearing 22 is attached to the central portion of the voice coil motor 14.

For example, when the head supporting portion 21 is rotated in the direction of arrow B by the voice coil motor 14, the magnetic head 2 is moved in the radial direction of the disk 10, and it becomes possible to conduct scanning on a desired track. Components, which include the voice coil motor 14 and the head supporting portion 21, are referred to as a head actuator. A flexible printed board 24, which is usually referred to as FPC (flexible printed circuit) for abbreviation, is attached to this head actuator. A servo signal $S_{dv}$ (shown in FIG. 4) for controlling actions of the voice coil motor 14 and the magnetic head 2 is supplied via this flexible printed board 24.

A ramp mechanism 23 is arranged in the outer circumferential portion of the disk 10. This ramp mechanism 23 is engaged with the slider 20 arranged at a forward end portion of the head supporting portion 21 so as to hold the magnetic head 2 separate from the disk 10.

Further, in the disk device 1, a host interface (host I/F in FIG. 4) 48 is provided which connects the control unit 4 (shown in FIG. 4) of the disk device 1 with a host system 6 (shown in FIG. 4) such as a host processor arranged outside the disk device 1.

Next, referring to FIG. 4, the constitution of the control unit 4 of the disk device of the embodiment of the present invention will be explained in detail below.

As shown in FIG. 4, a regenerative signal, which has been read out from the disk 10 by the magnetic head 2, is supplied to the head IC 16 in the disk enclosure and detected and amplified by the head position detecting unit 17. After that, the signal is supplied to the control unit 4.

In the control unit 4 shown in FIG. 4, the printed circuit assembly includes a reading channel (RDC shown in FIG. 4) 44 for demodulating data information and servo information $P_s$ from the regenerative signal $S_r$ supplied from the head IC 15; and a micro-processor unit 40 (MPU in FIG. 4) for controlling all the operations related to reading and writing of data according to the servo information $P_s$ outputted from this reading channel 44. It is possible to pick up positional information with respect to a track position of the magnetic head 2 on the disk from the above servo information $P_s$.

Further, in the control unit shown in FIG. 4, the printed circuit assembly includes a hard disk controller (HDC in FIG. 4) 41 for controlling the operation of the disk device 1 according to a command issued from the host system 6 such as a host processor arranged outside the disk device 1 and for demodulating the ECC (error checking and correcting) code to detect and correct an error in data; a data buffer 42 such as RAM (random access memory) for temporarily storing data to be read out/written in so as to make up for a difference between the data transfer bit speed of the host system and the data transfer bit speed of the magnetic head; a flash ROM (FROM (flash read-only memory) in FIG. 4) for storing a program (firm ware) to carry out reading out/writing in of data; and a servo controller 45 for controlling the operation of the spindle motor 13 and the voice coil motor 14. It is preferable that dynamic RAM (DRAM) of high speed and large capacity is usually used for RAM of the data buffer 42.

In the control unit composed as described above, in the case in which a writing command for writing data is issued from the host system 6, the MPU 40 of the control unit 4 operates according to a program previously stored in the program storage unit such as flash ROM 43 and sends a reading channel control signal to the reading channel 44. This reading channel 44 sends out the writing signal $S_w$, which is encoded according to the data signal (R/W DATA) for reading/writing, to the head IC 15. This the head IC 15 amplifies the writing signal $S_w$ and converts it into a writing electric current and sends it to the recording head element 26 of the magnetic head 2.

On the other hand, in the case in which a reading command for reading out data is issued from the host system 6, the MPU 40 of the control unit 4 operates according to the program (information $S_c$ related to the program) previously stored in the flash ROM 43 and sends out the hard disk control signal S-HDC to the head IC 15. This head IC 15 amplifies a regenerative signal outputted from the reproducing head element 30 of the magnetic head 2 and sends out to the reading channel 44. In this case, the reading channel 44 confirms whether or not the regenerative signal $S_r$ is read out from a sector at a correct position on the disk surface, on the basis of the data signal (R/W DATA) for writing/reading, and the servo information $P_s$ containing positional information is sent out to the MPU 40.

Further, the MCU 40 of the control unit 4 generates the VCM control signal S-VCM for controlling the operation of the voice coil motor 14 according to various control signals, which are sent from the host system 6, and the servo information $P_s$. Then the MCU 40 sends out the signals to the servo controller 45. The servo signal $S_{dv}$ for the voice coil motor, which is generated on the basis of this VCM control signal S-VCM, is supplied to the voice coil motor 14 via the driver 46. According to this servo signal $S_{dv}$, the voice coil motor 14 is started, that is, the electric current I-VCM flows in the voice coil motor 14, and the seeking operation of the magnetic head 2 with respect to a designated position is executed. At the same time, the servo signal $S_{ds}$ for the spindle motor, which is generated according to the VCM control signal S-VCM, is supplied to the spindle motor 13 via the driver 47. According to this servo signal $S_{ds}$, the spindle motor 13 is started, that is, the electric current I-DCM flows in the spindle motor 13, and the disk 10 is rotated.

In the control unit 4 shown in FIG. 4, the modulation detecting means 5 for detecting a modulation, which is generated by the contact between the magnetic head 2 and the disk 10, is mounted on the printed circuit assembly. This modulation detecting means 5 has a function of detecting that a modulation has been generated by the contact between the magnetic head 2 and the disk 10 by HDI, on the basis of the regenerative signal $S_r$ in the single frequency data region which is read out by the reproducing head element 30 when the magnetic head 2 is moved to a predetermined position in each track in which the single frequency data region is previously formed.

In more detail, the modulation detecting means 5 includes a reproducing signal output level detecting unit 51 for detecting an output level of the regenerating signal $S_r$ of the single frequency data region which is read out by the reproducing head element; and a Fourier transform unit 52 for carrying out a Fourier transform on the regenerative signal detected by the regenerative signal output level detecting unit 51. In this case, the regenerative signal output level detecting unit 51 can be composed of a comparator for comparing the output level of the regenerative signal $S_r$ with the reference level.

In general, in the case in which the magnetic head 2 comes into contact with the disk 10, a natural oscillation is generated in the slider 20 holding the magnetic head 2. At this time, a modulation of several hundred kHz corresponding to the resonance frequency of the natural oscillation of the slider 20 appears in the regenerative signal $S_r$ which is read out by the reproducing head element 30. When an output level of this regenerative signal $S_r$ is detected by the regenerative signal output level detecting unit 51, it can be confirmed that an output waveform of the regenerative signal $S_r$ has fluctuated. In the Fourier transform unit 52, a Fourier transform is carried out on the regenerative signal outputted from the regenerative signal output level detecting unit 51, and a regenerative signal frequency component having a modulation frequency corresponding to the resonance frequency of the slider 20 is extracted.

On the other hand, when a level of the regenerative signal frequency component extracted by the Fourier transform unit 52 is detected, it is possible to recognize a level of the generation of the modulation caused by the contact between the magnetic head 2 and the disk 10. Further, the MPU 40 sends out a control signal to the heater electric power supply unit 16 according to the level of the generation of the modulation. According to this control signal, the heater electric power supply unit 16 suppresses an intensity of the electric power to be supplied to the heater element 25, so that an amount of protrusion onto the magnetic recording surface of the reproducing head element 30 can be reduced.

As described above, according to the embodiment of the present invention, when an amount of protrusion of the reproducing head element is reduced according to the generation level of the modulation, it is possible to evade the contact of the magnetic head with the disk. Accordingly, it is possible to prevent the generation of the modulation caused by the above contact and it is also possible to prevent the deterioration of the magnetic characteristic of the magnetic head.

The function of the modulation detecting means 5, which includes the regenerative signal output level detecting unit 51 and the Fourier transform unit 52, can be realized by MPU the 40 of a computer or CPU (Central Processing Unit). In more detail, the program for data processing, which is stored in the program storage unit such as flash ROM 43, and various data necessary for executing programs stored in the data storage unit such as RAM are read out by MPU 40 (or CPU) and the program is carried out. Due to the foregoing, the function corresponding to the function of the modulation detecting means 5 can be realized.

More specifically, the program accommodated in the flash ROM 43 in FIG. 4 includes a step of previously forming a single frequency data region at a predetermined position in each track of the disk, a step of detecting the occurrence of modulation, which is caused by a contact between the magnetic head and the disk, on the basis of a regenerative signal of the single frequency data region; a step of reading out a regenerative signal of the single frequency data region by the reproducing head element when the magnetic head is moved to a predetermined position of each track; a step of detecting an output level of the regenerating signal of the single frequency data region which is read out by the reproducing head element; a step of carrying out a Fourier transform on the regenerative signal, the output level of which has been detected; a step of detecting that a modulation has been generated by extracting a regenerative signal frequency component corresponding to the frequency of a modulation caused by the contact between the magnetic head and the disk; and a step of reducing an amount of protrusion of the recording head element or the reproducing head element by decreasing electric power supplied to the heater element when the generation of the modulation is detected.

Figure 5:
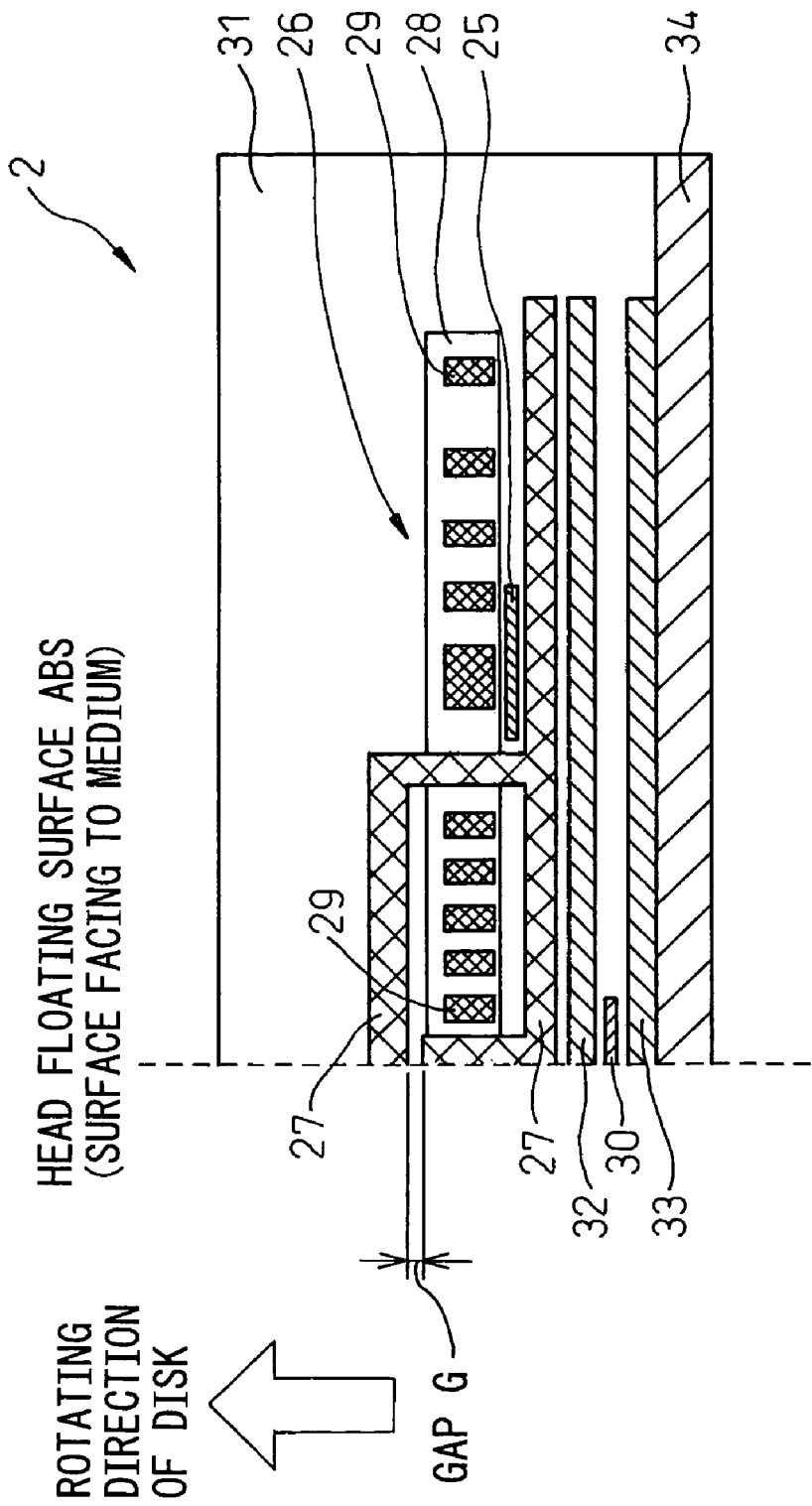
FIG. 5 is a sectional view (I) showing an example of the structure of a magnetic head used for a disk device of the present invention.
Figure 6:
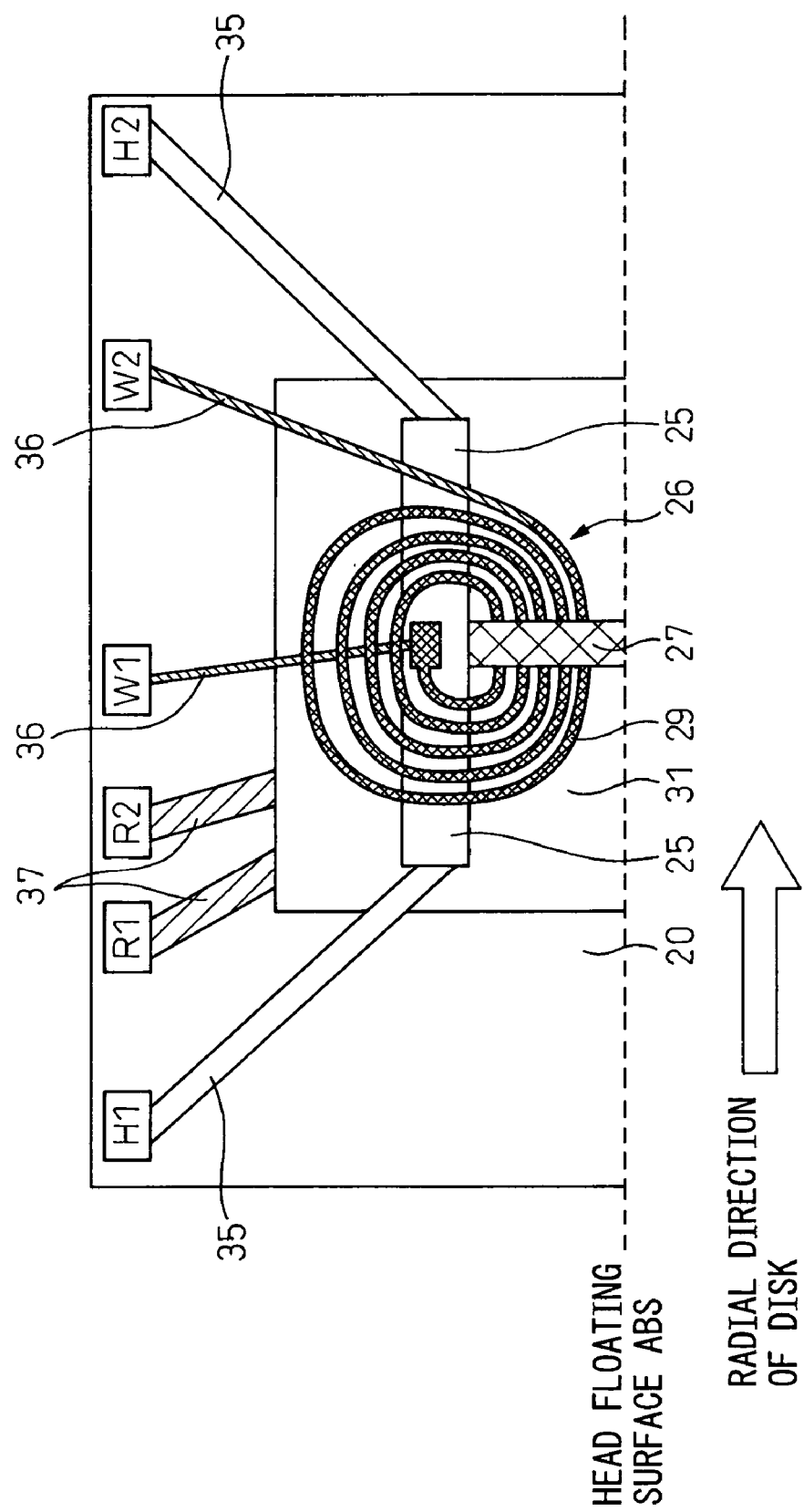
FIG. 6 is a sectional view (II) showing an example of the structure of a magnetic head used for a disk device of the present invention.

FIG. 5 is a sectional view (I) showing an example of the structure of a magnetic head used for a disk device of the present invention, and FIG. 6 is a sectional view (II) showing an example of the structure of a magnetic head used for a disk device of the present invention. In this case, the magnetic head is the same magnetic head, into which a heater heating function is incorporated, as that shown in FIGS. 3 and 4, and an outline of the structure of the magnetic head of the longitudinal magnetic recording system is shown in the enlarged sectional view. In this connection, FIG. 5 is a sectional view taken in a direction perpendicular to the head floating surface (ABS, referred to as a surface facing to a medium) of the magnetic head 2 and in the rotary direction (the circumferential direction) of the disk. FIG. 6 is a sectional view taken in a direction perpendicular to the head floating surface (ABS) and in the radial direction of the disk. However, it should be taken into account that the structure of the cross-section of the magnetic head 2 is shown enlarged at a different ratio in FIGS. 5 and 6. In this connection, the same reference characters are used to indicate the same components hereinafter in this specification.

In the same manner as that of the embodiment shown in FIGS. 3 and 4, the magnetic head 2 shown in FIGS. 5 and 6 includes a recording head element 26 such as a thin film inductive type head element used for writing; and a reproducing head element 30 such as a magnetic resistance effect element used for reading; and a heater element 25 arranged close to the recording head element 26 or the reproducing head element 30.

In the magnetic head 2 shown in FIGS. 5 and 6, in the recording head element 26, the thin film coil 29 is formed which generates a magnetic field necessary for writing in information on the disk. This thin film coil 29 is covered with an epoxy resin layer 28. Further, in order to condense the magnetic field which is generated on this thin film coil 29 so that the magnetic field can be effectively supplied to an arbitrary position on the magnetic recording surface of the disk, a thin film core 27 made of magnetic material is arranged close to the thin film coil 29. Further, in order to supply a magnetic field, which has passed through the thin film core 27, to an arbitrary position (not shown) on the magnetic recording surface of the disk, a gap G is provided on the head floating surface (ABS). In general, components provided in the recording head 26 such as a thin film coil 29 and a thin film core 27 are covered with a non-magnetic insulating layer 31 made of alumina.

In the magnetic head 2 shown in FIGS. 5 and 6, in the case in which information is to be recorded at an arbitrary position on the magnetic recording surface of the disk, a predetermined electric current is made to flow from the writing terminals W1, W2 into the thin film coil 29 via the recording head element connecting unit 36 of a conductor, a magnetic field necessary for writing in information is generated. This magnetic field generated by the thin film coil 29 is transmitted through the thin film core 27 and impressed upon an arbitrary position on the magnetic recording surface of the disk as a recording magnetic field parallel with the magnetic recording surface of the disk. A magnetic circuit is formed by the thin film core 27 and the magnetic recording surface of the disk. When this magnetic circuit and the gap G are utilized, the magnetization (information) parallel with the magnetic recording surface of the disk can be recorded at an arbitrary position on the magnetic recording surface.

In the magnetic head 2 shown in FIGS. 5 and 6, in the periphery of the reproducing head element 30 such as a magnetic resistance effect element, an upper shield layer 32 made of magnetic material, which is formed on the reproducing head element 30 via a non-magnetic insulating layer (not shown), is arranged and a lower shield layer 33 made of magnetic material, which is formed on the non-magnetic base board 34 made of a ceramic such as Altic ($Al_2O_3.TiC$), is also arranged. The upper shield layer 32 and the lower shield layer 33 have a function of preventing the intrusion of a floating magnetic field into the reproducing head element from the outside. Concerning the reproducing head element 30, it is possible to use an element, in which a magneto-sensitive film showing a magnetic resistance effect is used, such as an AMR (anisotropic magneto-resistance effect) element, a GMR (giant magneto-resistance effect) element or a TMR (tunneling magneto-resistance effect) element.

In the case in which information recorded at an arbitrary position on the magnetic recording surface of the disk is to be reproduced in the magnetic head 2 shown in FIGS. 5 and 6, a minute electric current is made to flow in the reproducing head element 30 such as a magnetic resistance effect element via the reproducing head element connecting unit 37 of a conductor from the terminals R1, R2 for reading, and when a leaked magnetic field, which is caused by the magnetization in a direction parallel with the magnetic recording surface of the disk, is picked up, a change in the magnetic resistance of the reproducing head element 30 is detected. When the regenerative signal corresponding to the thus detected change in the magnetic resistance is amplified by the head position detecting unit (shown in FIG. 4) and sent to the control unit 4 (shown in FIG. 4), it is possible to reproduce the information recorded at an arbitrary position on the magnetic recording surface of the disk.

Further, a non-magnetic insulating layer (not shown) is formed on the upper shield layer 32 of the reproducing head element 30. On this non-magnetic insulating layer, one portion of the thin film core 27 of the recording head element 26 is formed. The aforementioned thin film coil 29 is formed close to this thin film core 27.

In the disk device such as the magnetic disk device, it is possible to record information at an arbitrary position on the magnetic recording surface of the disk with the recording head element 26 shown in FIGS. 5 and 6. It is also possible to reproduce the information recorded at the arbitrary position on the magnetic recording surface with the reproducing head element 30.

Further, in the magnetic head 2 shown in FIGS. 5 and 6, the heater element 25 formed out of a thin film resistance element of a conductor is arranged close to the recording head element 26 and the reproducing head element 30. As described before, in order to protect the recording head element 26, the reproducing head element 30 and the heater element 25, the magnetic head 2 is entirely covered with a non-magnetic insulating layer 31 made of alumina. Further, in order to hold the magnetic head 2 under the condition that it is floating above the magnetic recording surface of the disk, the magnetic head 2 is mounted on the slider 20.

In the magnetic head 2 shown in FIGS. 5 and 6, in the case in which is required to increase the S/N ratio of the regenerative signal of the reproducing head element, electric power is supplied from the heater terminals H1, H2 to the heater element 25 via the heater element connecting unit 35. When a portion close to the reproducing head element 30 is heated at this time, the alumina is expanded, and the slider 20 or the head floating surface (ABS) of the magnetic head 2 protrudes toward a surface of the medium of the disk 10. Due to the foregoing, an amount of protrusion of the reproducing head element 30 onto the medium surface is increased. Therefore, a magnetic space formed between the magnetic head 2 and the disk 10 is decreased and the S/N ratio of the regenerative signal of the reproducing head element is enhanced.

However, in the embodiment of the present invention, as described before, in the case in which the generation of a modulation is detected which is caused by the contact between the magnetic head 2 and the disk, in order to evade the contact between the magnetic head 2 and the disk, an intensity of electric power supplied to the heater element 25 is suppressed corresponding to a level of the generation of the above modulation so as to reduce an amount of protrusion of the reproducing head element 30 toward the magnetic recording surface.

In this connection, in FIGS. 5 and 6, explanations are made into the structure of the magnetic head of the longitudinal magnetic recording system. However, it is possible to use a magnetic head of the perpendicular magnetic recording system in the disk device of the present invention.

Figure 7:
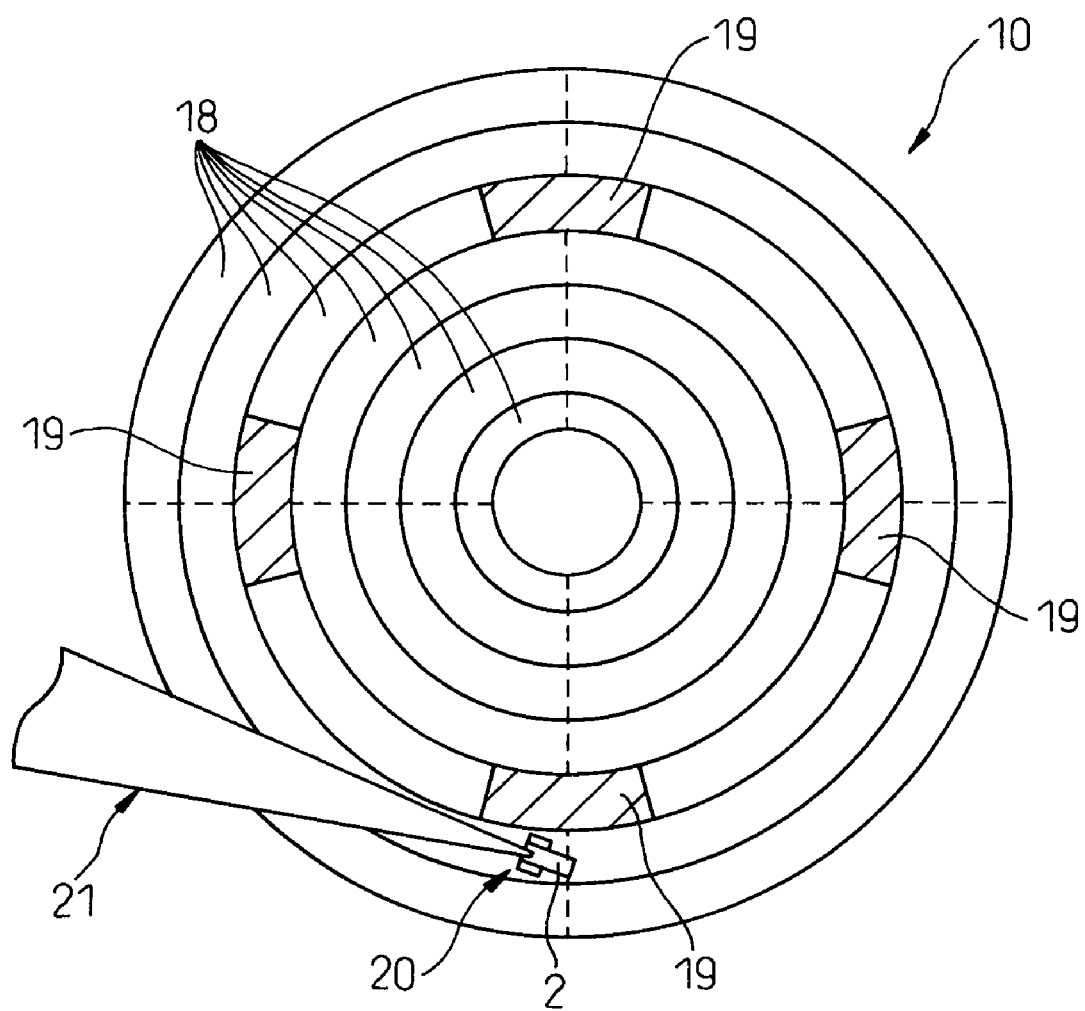
FIG. 7 is a pattern arrangement view showing an example of an arrangement of a single frequency data region formed in each track on a disk.
Figure 8:
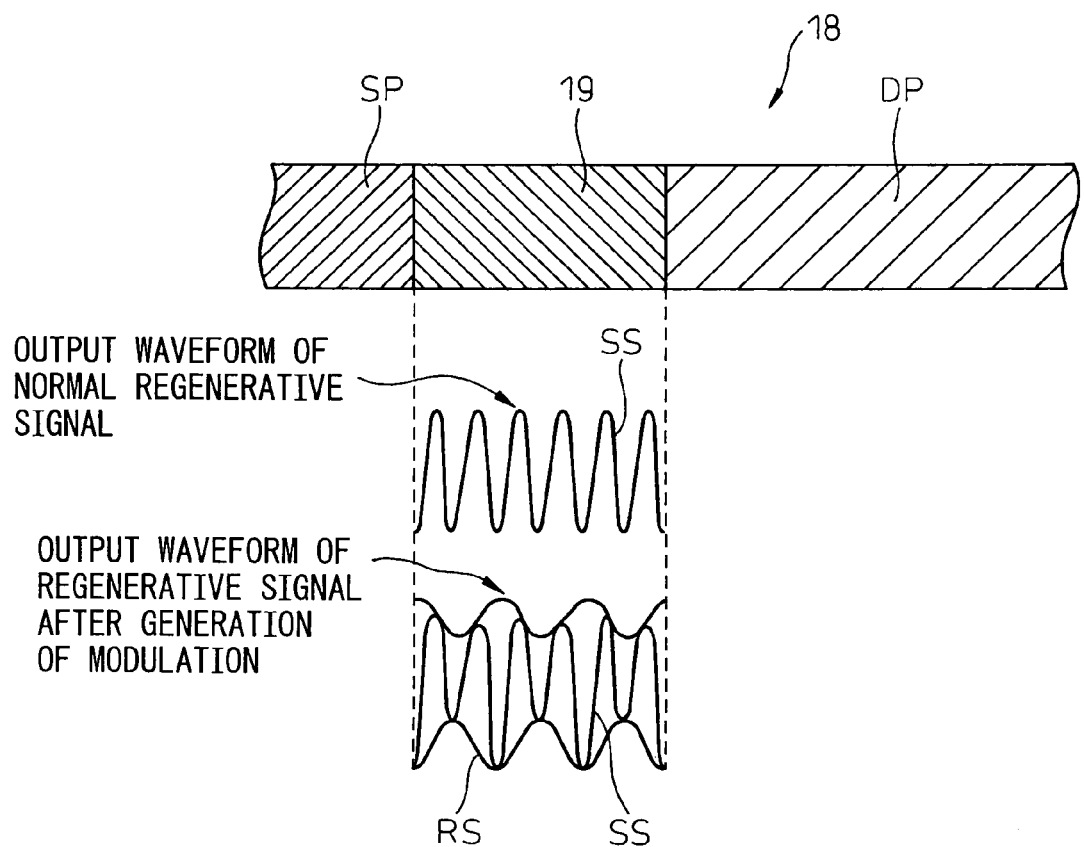
FIG. 8 is a pattern arrangement view in which a single frequency data region is shown enlarged.

FIG. 7 is a pattern arrangement view showing an example of the arrangement of the single frequency data regions formed in the tracks on the disk. FIG. 8 is a pattern arrangement view in which the single frequency data region is shown enlarged. This is a view briefly showing an example of the single frequency data region formed in a portion of the data pattern region in a plurality of tracks 18.

As shown in FIG. 7, in the embodiment of the present invention, a single frequency data region 19 formed out of the single frequency data is previously formed in a portion (a portion of a plurality of sectors) of the region, in which a data pattern is written, in each track (For example, refer to the third track from the outermost track.) on the disk 10. In general, in the case in which the magnetic head 2 comes into contact with the medium of the disk 10, a natural oscillation of the slider 20 provided at a forward end of the head supporting portion 21 is generated. Accordingly, a modulation of several hundred kHz corresponding to the resonance frequency of this natural oscillation is generated and appears in the regenerative signal of the reproducing head element. In order to accurately detect that the modulation corresponding to the resonance frequency by the natural oscillation of the slider has been generated, as a single frequency which becomes a reference at the time of detecting the modulation, it is necessary to select a frequency which is relatively frequently used. More specifically, it is preferable that the single frequency is set at a frequency of about ½ of the maximum frequency corresponding to the maximum transfer bit speed in each track.

As an example of the above single frequency data region 19, as shown in an upper portion of FIG. 8, in a sector of each track 18, it is possible to previously form a single frequency data region 19 at a head position of the data pattern DP written in after the servo signal pattern SP.

In the case in which the magnetic head 2 does not come into contact with the disk 10, as shown in the middle portion of FIG. 8, an output level of the regenerative signal of the reproducing head element does not actually fluctuate. Therefore, when the magnetic head 2 is moved to a sector position of each track at which the single frequency data region is previously formed, a normal regenerative signal output waveform, which is composed of only the single frequency data SS, is detected. In other words, in this case, the generation of a modulation caused by the contact between the magnetic head 2 and the disk 10 is not detected.

On the other hand, in the case in which the magnetic head 2 comes into contact with the disk 10, as shown in the lower portion of FIG. 8, a modulation is generated by the signal RS corresponding to the resonance frequency of the natural oscillation of the slider 20, and an output level of the regenerative signal of the reproducing head element fluctuates. Therefore, when the magnetic head 2 is moved to a sector position of each track in which the single frequency data region is previously formed, a regenerative signal output waveform after the generation of the modulation is detected. Due to the foregoing, it is possible to accurately detect that the modulation has been generated by the contact between the magnetic head 2 and the disk 10.

Figure 9:
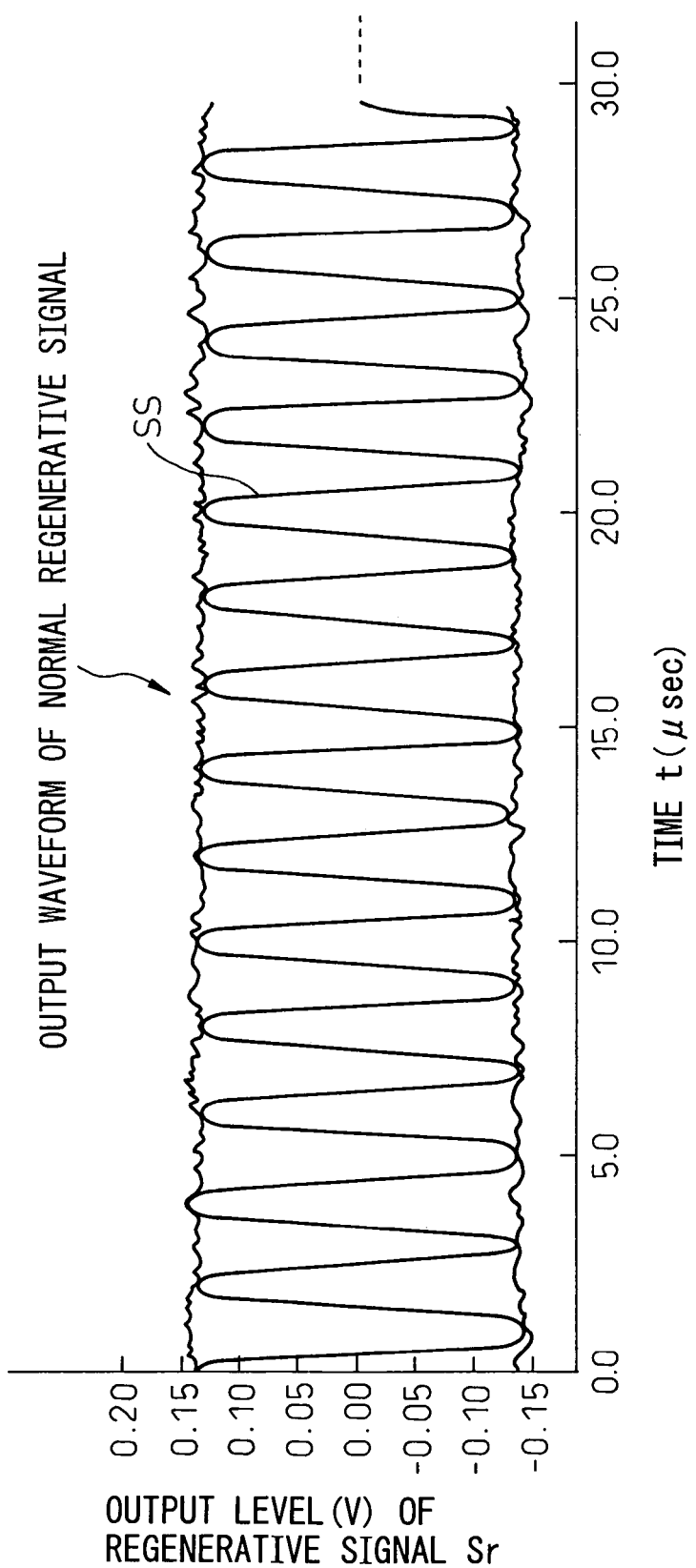
FIG. 9 is a signal waveform diagram briefly showing a usual regenerative signal output waveform in the case in which a magnetic head does not come into contact with a medium.
Figure 10:
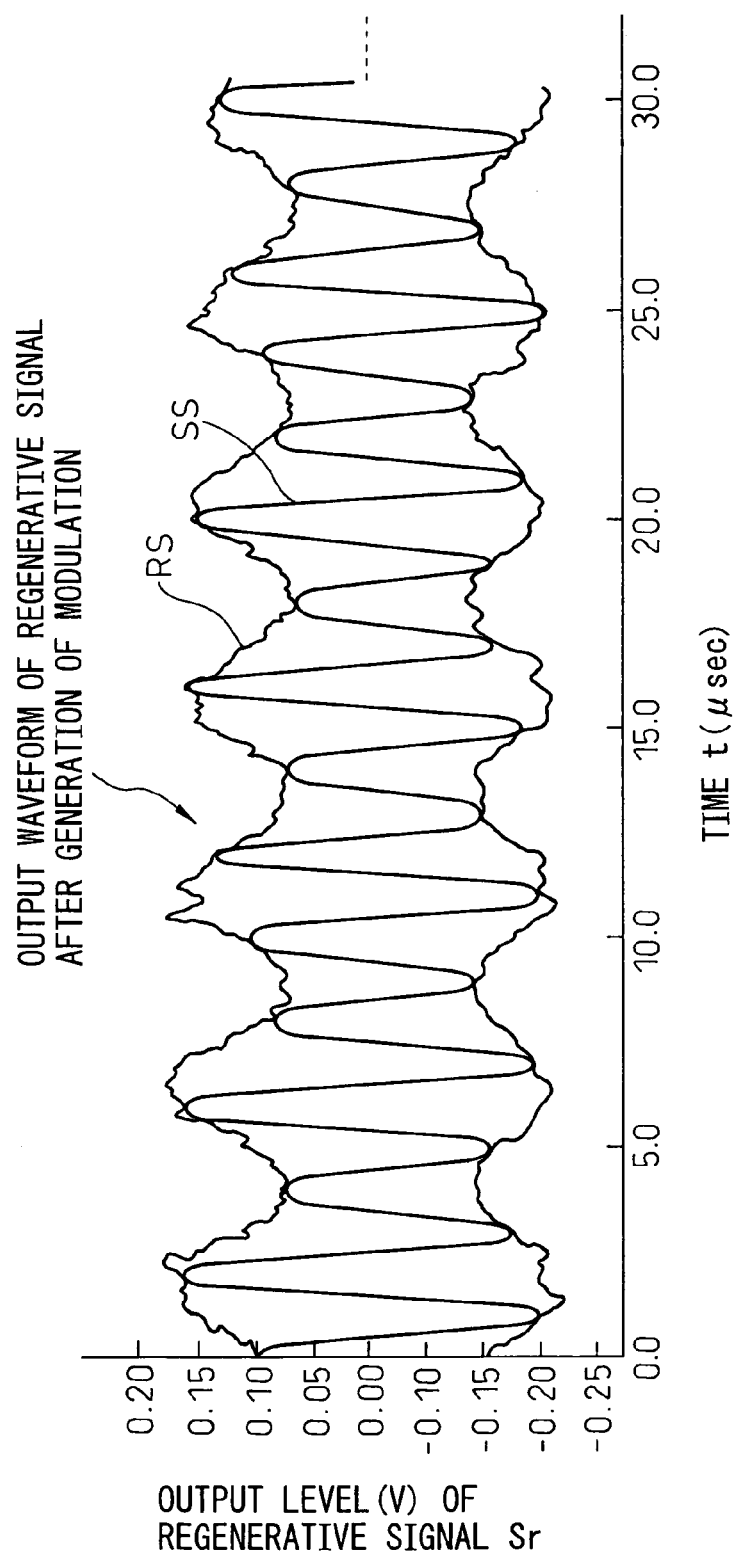
FIG. 10 is a signal waveform diagram briefly showing a regenerative signal output waveform after the generation of modulation in the case in which a magnetic head comes into contact with a medium.

FIG. 9 is a signal waveform diagram briefly showing a usual regenerative signal output waveform in the case in which a magnetic head does not come into contact with a medium, and FIG. 10 is a signal waveform diagram briefly showing a regenerative signal output waveform after the generation of modulation in the case in which a magnetic head comes into contact with a medium. In order to clearly express the circumstances of the fluctuation of the regenerative signal output waveform right after the generation of a modulation, the regenerative signal waveforms shown in FIGS. 9 and 10 are shown by enlarging the regenerative signal waveforms shown in the middle portion and the lower portion of FIG. 8.

As shown in FIG. 9, in the case in which the magnetic head is not contacted with the disk, an output level (voltage V) of the regenerative signal $S_r$ of the reproducing head element does not substantially fluctuate with respect to the time t (micro-second (μsec)), and the regenerating signal of the single frequency data SS is reproduced at regular intervals of time. Accordingly, in this case, the generation of a modulation caused by the contact between the magnetic head and the disk is not detected by the regenerative signal output level detecting unit (shown in FIG. 4).

On the other hand, as shown in FIG. 10, in the case in which the magnetic head comes into contact with the disk, a modulation is generated by the signal RS corresponding to the resonance frequency of the natural oscillation of the slider head, and an output level (voltage V) of the regenerative signal $S_r$ of the reproducing head element fluctuates with respect to the time t (micro-second (μsec)). As a result, a regenerative signal, in a state in which the regenerative signal of the single frequency data SS is modulated by the above signal RS, is outputted. Accordingly, in this case, fluctuation of the output level of the regenerative signal $S_r$ caused by the contact between the magnetic head and the disk is detected. Further, after a Fourier transform of the regenerative signal $S_r$ has been carried out by a Fourier transform unit (shown in FIG. 4), a regenerative signal frequency component having a modulation frequency corresponding to the resonance frequency of the slider is extracted. When a level of the regenerative signal frequency component extracted by a Fourier transform unit is detected, it is possible to recognize the level of the generation of the modulation caused by the contact of the magnetic head and the disk.

FIG. 11 is a flow chart for explaining a control flow of the disk device of the embodiment of the present invention. In this case, explanations will be made into a control flow for evading the generation of a modulation, which is caused by the contact between the magnetic head and the disk, by operating an MPU provided in the disk unit (shown in FIG. 4).

First, in step S1, when the magnetic head is moved to a predetermined position in each track (or each cylinder) in which the single frequency data region is previously formed, a regenerative signal in the single frequency data region is read out by the reproducing head element.

Next, in step S2, fluctuation of the output level of the regenerative signal, which is a regenerative signal after the generation of the modulation caused by the contact between the magnetic head and the disk and which is a regenerative signal in the single frequency data region, is detected.

Further, in step S3, the output data of the regenerative signal detected in step S2 is subjected to a Fourier transform.

Further, in step S4, it is confirmed whether or not a regenerative signal frequency component having a modulation frequency corresponding to the resonance frequency of the natural oscillation of the slider is extracted.

In the case in which the regenerative signal frequency component having the modulation frequency is extracted in step S4, an intensity of electric power supplied to the heater element is reduced according to the level of the generation of the modulation in step S5. Due to the foregoing, an amount of protrusion of the reproducing head element toward the magnetic recording surface is decreased.

On the other hand, in the case in which the regenerative signal frequency component having the modulation frequency is not extracted in the above step S4, normal writing/ reading operations are carried out in step S6 while an intensity of electric power supplied to the heater element is being maintained as it is.

Concerning the industrial applicability of the present invention, the present invention can be applied to a disk device, such as a magnetic disk device or an optical magnetic disk device, having a function of controlling a magnetic space formed between a magnetic head and a medium on a disk by using the magnetic head having a heater heating function which is accomplished by a heater element arranged close to a recording head element and a reproducing head element so that the disk device can cope with an increase in the storage capacity of the disk device and also cope with an enhancement of the recording density of the disk medium.

The invention claimed is:

1. A disk device comprising a disk drive unit for pivotally driving a disk; a magnetic head including a recording head element for recording information at arbitrary positions in a plurality of tracks formed in a region ranging from an inner circumferential portion to an outer circumferential portion of the disk and also including a reproducing head element for reproducing the information recorded at the arbitrary positions in the plurality of tracks and also including a heater element arranged close to the recording head element or the reproducing head element so as to heat the recording head element or the reproducing head element; a head drive unit for driving the magnetic head so that the magnetic head can be moved between the plurality of tracks of the disk; and a control unit for controlling various operations including an operation of writing information at arbitrary positions of the disk with the magnetic head and also including an operation of reading out the information written at the arbitrary positions, wherein;

a single frequency data region is previously formed at a predetermined position in each track of the disk, a single frequency of the single frequency data region is set at a frequency of about ½ of the maximum frequency corresponding to the maximum transfer bit speed in each track, the disk device further comprising a modulation detecting means for detecting the generation of modulation, which is caused by contact between the magnetic head and the disk, on the basis of a regenerative signal of the single frequency data region reproduced by the reproducing head element when the magnetic head is moved to a predetermined position of each track, wherein;

the modulation detecting means includes:

a regenerative signal output level detecting unit for detecting an output level of the regenerative signal of the single frequency data region reproduced by the reproducing head element; and a Fourier transform unit for carrying out a Fourier transform on the regenerative signal detected by the regenerative signal output level detecting unit, wherein;

when a regenerative signal frequency component corresponding to the modulation frequency is extracted by the Fourier transform unit, the generation of the modulation is detected, and when the generation of the modulation is detected, the control unit reduces an amount of protrusion of the recording head element or the reproducing head element by decreasing an intensity of electric power supplied to the heater element.

2. A method of controlling a disk device, the disk device comprising a disk drive unit for pivotally driving a disk;

a magnetic head including a recording head element for recording information at arbitrary positions in a plurality of tracks formed in a region ranging from an inner circumferential portion to an outer circumferential portion and also including a reproducing head element for reproducing the information recorded at the arbitrary positions in the plurality of tracks and also including a heater element arranged close to the recording head element or the reproducing head element so as to heat the recording head element or the reproducing head element; a head drive unit for driving the magnetic head so that the magnetic head can be moved between the plurality of tracks of the disk; and a control unit for controlling various operations including an operation of writing information at arbitrary positions of the disk with the magnetic head and also including an operation of reading out the information written at the arbitrary position, the method of controlling the disk device including:

a step of previously forming a single frequency data region at a predetermined position in each track of the disk, a single frequency of the single frequency data region is set at a frequency of about ½ of the maximum frequency corresponding to the maximum transfer bit speed in each track;

a step of reading out a regenerative signal of the single frequency data region by the reproducing head element when the magnetic head is moved to a predetermined position of each track;

a step of detecting the generation of modulation, which is caused by contact between the magnetic head and the disk, on the basis of a regenerative signal of the single frequency data region; and a step of reducing an amount of protrusion of the recording head element or the reproducing head element by decreasing an intensity of electric power supplied to the heater element when the generation of the modulation is detected, the step of detecting the generation of modulation including:

a step for detecting an output level of the regenerative signal of the signal frequency data region reproduced by the reproducing head element; and a step for carrying out a Fourier transform on the detected regenerative signal, wherein;

when a regenerative signal frequency component corresponding to the modulation frequency is extracted by the Fourier transform, the generation of the modulation is detected.

* * * * *